US011758040B2

(12) United States Patent
Vincent et al.

(10) Patent No.: US 11,758,040 B2
(45) Date of Patent: Sep. 12, 2023

(54) SYSTEMS AND METHODS FOR USE IN BLOCKING OF ROBOCALL AND SCAM CALL PHONE NUMBERS

(71) Applicant: BCE Inc., Verdun (CA)

(72) Inventors: David Vincent, Verdun (CA); Harsh Gadgil, Verdun (CA); Yuecai Zhu, Verdun (CA)

(73) Assignee: BCE Inc., Verdun (CA)

( * ) Notice: Subject to any disclaimer, the term of this patent is extended or adjusted under 35 U.S.C. 154(b) by 0 days.

(21) Appl. No.: 17/560,555

(22) Filed: Dec. 23, 2021

(65) Prior Publication Data

US 2022/0224790 A1 Jul. 14, 2022

Related U.S. Application Data

(60) Provisional application No. 63/132,605, filed on Dec. 31, 2020.

(51) Int. Cl.
*H04M 3/22* (2006.01)

(52) U.S. Cl.
CPC ....... *H04M 3/2281* (2013.01); *H04M 3/2218* (2013.01)

(58) Field of Classification Search
CPC . G06F 3/16; G06F 3/167; G10L 13/00; G10L 13/02; G10L 15/20; G10L 25/48; H04M 19/04
See application file for complete search history.

(56) References Cited

U.S. PATENT DOCUMENTS

| 8,966,074 | B1* | 2/2015 | Richards | H04M 15/8214 709/224 |
| 9,729,727 | B1* | 8/2017 | Zhang | H04M 15/00 |
| 10,045,218 | B1* | 8/2018 | Stapleton | G06N 5/01 |
| 2011/0219454 | A1* | 9/2011 | Lee | G06F 21/577 707/706 |
| 2016/0269908 | A1* | 9/2016 | Richards | G06Q 20/08 |
| 2017/0265076 | A1* | 9/2017 | Richards | G06Q 20/3223 |
| 2021/0203780 | A1* | 7/2021 | Welch | H04M 3/2281 |

FOREIGN PATENT DOCUMENTS

WO WO-2016191369 A1 * 12/2016 ............. G06Q 10/10

OTHER PUBLICATIONS

Extended European Search Report from corresponding European Patent Application No. 22200962.3 dated May 22, 2023.

\* cited by examiner

*Primary Examiner* — Akelaw Teshale

(57) ABSTRACT

Telephone numbers that are associated with robocalls or scam calls can be automatically identified by a telephone network operator. The identified telephone numbers may be blocked from placing phone calls on the telephone network.

15 Claims, 6 Drawing Sheets

Wangiri calls detection v3.1

| Anumber | Predicted (All) ▼ | | | | event_date ▼ | | | Predicted (All) ▼ | | | | | | Category (All) ▼ |
|---|---|---|---|---|---|---|---|---|---|---|---|---|---|---|
| | | | | | TODAY | YESTERDAY | LAST 7 DAYS | LAST WEEK | | | | | | |
| | | | | | LAST 30 DAYS | THIS MONTH | | LAST MONTH | | | | | | |

Wangiri detection – All ISUP records

| Anumber | Predicted | Category | cat_date | CallBack record | Detection date | Detection count | Total Outgoing Calls | Total Incoming Calls | Avg. % Unanswered | Avg. Call Duration (sec) | Avg. % Intl Origination | Avg. % Rejected |
|---|---|---|---|---|---|---|---|---|---|---|---|---|
| 2431231774 | Wangiri | Wangiri | 2020-06-19 | 0:00/0:19 | 2020-06-19 10:02:25 | 1 | 88 | 0 | 83% | 0.70 | 100% | 1% |
| 6795190541 | Wangiri | Wangiri | 2020-05-22 | 0:00/0:19 | 2020-06-19 10:02:25 | 1 | 112 | 0 | 83% | 0.65 | 99% | 0% |
| 5977682026 | Wangiri | Wangiri | 2020-06-19 | 0:00/0:19 | 2020-06-19 10:02:25 | 1 | 77 | 0 | 95% | 0.04 | 100% | 1% |
| 5977682076 | Wangiri | | | | 2020-06-19 10:02:25 | 1 | 91 | 0 | 93% | 0.26 | 100% | 1% |
| 8492250922 | Manual review | | | | 2020-06-19 10:02:25 | 1 | 24 | 0 | 92% | 0.00 | 21% | 8% |
| 6795190525 | Wangiri | | | | 2020-06-19 10:02:25 | 1 | 125 | 0 | 88% | 0.27 | 100% | 0% |
| 2431231921 | Wangiri | Wangiri | 2020-06-19 | 0:00/0:19 | 2020-06-19 10:02:25 | 1 | 80 | 0 | 83% | 0.48 | 100% | 0% |
| 2431231769 | Wangiri | Wangiri | 2020-06-19 | 0:00/0:19 | 2020-06-19 10:02:25 | 1 | 86 | 0 | 86% | 0.43 | 99% | 3% |
| 5058476796 | Wangiri | Wangiri | 2020-06-19 | | 2020-06-19 10:02:25 | 1 | 22 | 0 | 73% | 0.49 | 96% | 18% |
| 2431231776 | Wangiri | Wangiri | 2020-06-19 | | 2020-06-19 10:02:25 | 1 | 90 | 0 | 84% | 0.89 | 100% | 0% |
| 5977682037 | Wangiri | Wangiri | 2020-06-19 | | 2020-06-19 10:02:25 | 1 | 95 | 0 | 89% | 0.42 | 100% | 0% |
| 5977682129 | Wangiri | Wangiri | 2019-09-22 | | 2020-06-19 10:02:25 | 1 | 81 | 0 | 84% | 0.45 | 99% | 2% |

*FIG. 2*

SYSTEMS AND METHODS FOR USE IN BLOCKING OF ROBOCALL AND SCAM CALL PHONE NUMBERS

CROSS-REFERENCE TO RELATED APPLICATIONS

The present application claims priority to U.S. Provisional Application No. 63/132,605, filed on Dec. 31, 2020, the entire contents of which is incorporated herein by reference for all purposes.

TECHNICAL FIELD

The current application relates to blocking calls and in particular to blocking calls placed from numbers used in Robocalls and/or scam calls.

BACKGROUND

Scam telephone calls and robocalls are becoming an increasing problem. There are solutions that can be used to block inbound calls from numbers known to be used by robocallers and/or for scam calls. While these solutions may be useful they require an end user to install some application or use a device to provide the desired functionality.

It is difficult to adapt existing solutions from end-user devices to a telephone network level as it may be unacceptable for the telephone network to block a number that was incorrectly identified as being associated with a robocall or scam call. Identifying telephone numbers associated with robocalls or scam calls based on data available to network operators can be a difficult task given the volume of data needed to process.

It would be desirable to have new, additional and/or improved tools for use by telephone network operators in identifying and blocking telephone numbers associated with making robocalls and/or scam calls.

BRIEF DESCRIPTION OF THE DRAWINGS

Further features and advantages of the present disclosure will become apparent from the following detailed description taken in combination with the appended drawings, in which:

FIG. 2 depicts a user interface presenting identified phone numbers;

DETAILED DESCRIPTION

Figure 1:
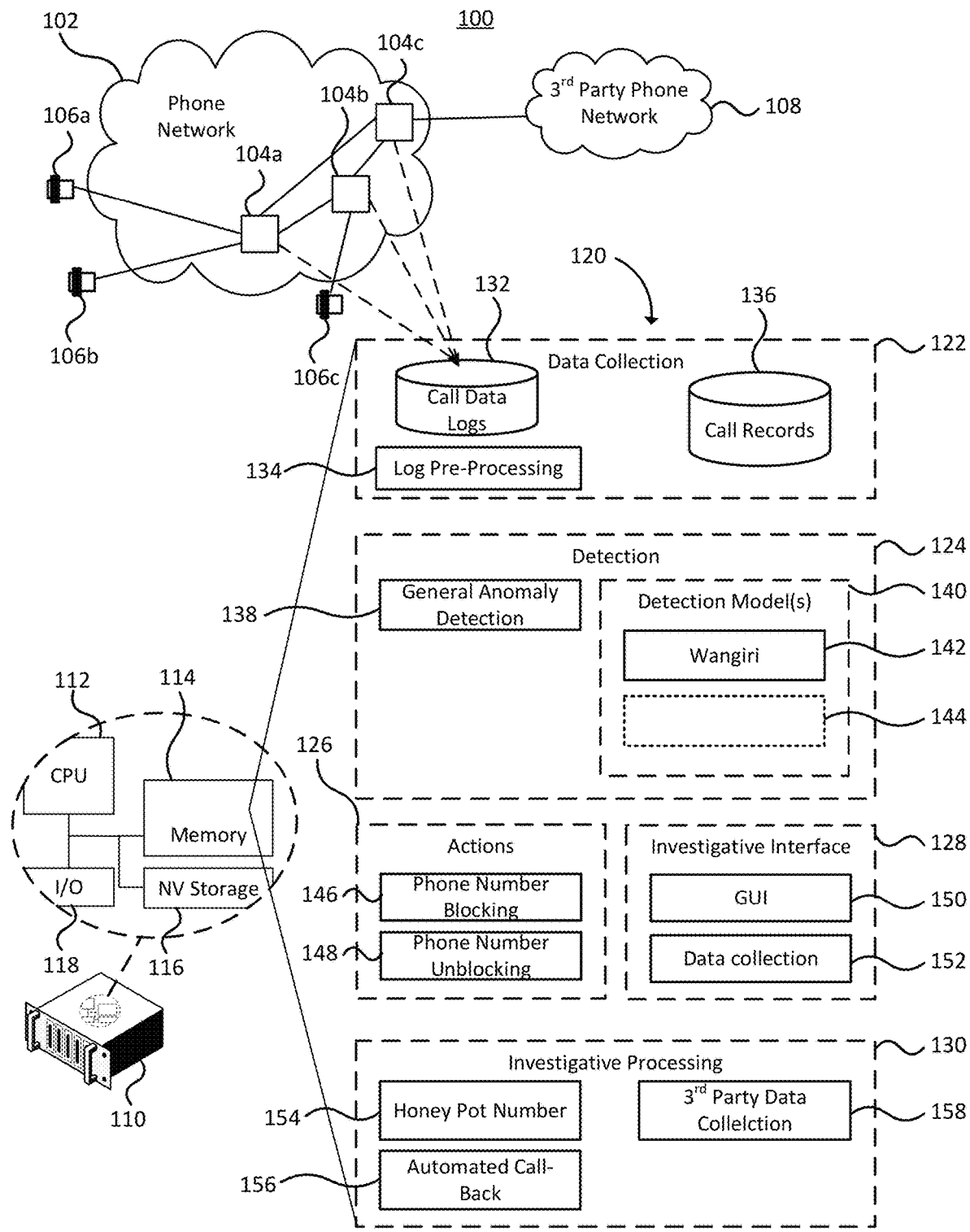
FIG. 1 depicts a system for identifying and blocking phone numbers associated with robocalls and/or scam calls.

In accordance with the present disclosure there is provided a system for use in blocking phone numbers in a telephone network comprising: one or more processors for executing instructions; and at least one memory for storing instructions, which when executed by at least one of the one or more processors configure the system to perform a method comprising: receiving from a plurality of telephone network elements a plurality of raw call log records; periodically processing the received plurality of raw call log records comprising: formatting each of the raw call log records into a corresponding call record having a common format; and identifying raw call log records or call records associated with a same call; and aggregating raw call log records or call records associated with the same call together; periodically processing the call logs comprising: processing the call logs using a first trained model to identify phone numbers associated with anomalous call behaviour as anomalous phone numbers; and processing the call logs using a second trained model to identify phone numbers associated with a first undesirable type of call behaviour as first undesirable call type phone numbers; and blocking at least one phone number of the anomalous phone numbers and the first undesirable call type phone numbers from making calls over the telephone network.

In an embodiment of the system, the first undesirable call type is a Wangiri type scam call.

In an embodiment of the system, the at least one phone number that is blocked is further processed to ensure the number should be blocked prior to being blocked.

In an embodiment of the system, the method provided by executing the instructions further comprises: automatically calling at least one of the phone numbers of the anomalous phone numbers and the first undesirable call type phone numbers; and recording a portion of the calls made automatically.

In an embodiment of the system, the method provided by executing the instructions further comprises: generating a user interface including an indication of one or more of the anomalous phone numbers and the first undesirable call type phone numbers; providing the generated user interface to an investigator of the telephone network operator; and receiving from the user interface a selection including the at least one phone number for blocking.

In an embodiment of the system, the generated user interface further includes an indication of the recorded portion of the calls.

In an embodiment of the system, the method provided by executing the instructions further comprises: retrieving additional information from one or more sources on the anomalous phone numbers and the first undesirable call type phone numbers; and including the additional information in the generated user interface. blocking at least one phone number of the anomalous phone numbers and the first undesirable call type phone numbers from making calls over the telephone network.

In an embodiment of the system, the method provided by executing the instructions further comprises: unblocking blocked phone numbers.

In an embodiment of the system, unblocking blocked phone numbers comprises: identifying blocked phone numbers; and for each blocked phone number, determining if there has been no call activity over the telephone network associated with the blocked phone number for a threshold period of days, and unblocking the blocked phone number when it is determined that the has been no call activity for the threshold period of days.

In accordance with the present disclosure there is further provided a method for use in detecting fraudulent phone numbers associated with undesirable behavior in a telephone network.

In accordance with the present disclosure there is further provided a system for detecting fraudulent phone numbers associated with undesirable behavior in a telephone network.

Undesirable phone calls can be a problem for consumers. These calls may include various types of scams or other undesirable calls. For example, some calls may impersonate a revenue agency such as the Canadian Revenue Agency (CRA) or the Internal Revenue Service (IRS) and have the victim transfer money or other payments to the perpetrator. Other types of scam calls may include Wangiri, or "one ring" calls in which a scammer calls a target from a phone number and hangs up after one or two rings, or just long enough to register as a missed call. This process may be repeated from the same or slightly different phone number. If the target calls back the phone number, for example out of curiosity, the return number may be for a "pay to call" or premium rate number causing the target to pay these charges. These types of scam calls may be made by robocalls, or may use robocalls to identify possible phone numbers that are active. As described further below, a telephone network operator may collect and process call data from their telephone network in order to identify phone numbers associated with the undesirable behaviours. Once such phone numbers are identified, they may be blocked from making and/or receiving calls on the telephone network operator's network.

FIG. 1 depicts a system for identifying and blocking phone numbers associated with robocalls and/or scam calls. The system 100 can be implemented by an operator of a telephone network 102, which may include different telephony technologies including for example, Voice over IP (VoIP), cellular, and landline or SS7. Regardless of the particular type or composition of telephone network, it will comprise a plurality of network elements 104a, 104b, 104c (referred to collectively as network elements 104) for completing telephone calls. The network elements 104 may connect the telephone network 102 to consumer (or end user) equipment such as telephones 106a, 106b, 106c (referred to collectively as telephones 106) as well as to other telephone networks 108 or other telephony equipment. Each of the network elements 104 may generate logs for each call, or attempted call, handled by the network elements 104. The logs may include various information about the call such as the telephone number of the party being called (called party or destination number), the telephone number of the party calling (calling party or source number), the time the call was placed, if the call was answered, if the call was answered by a voice message system, a geographical location of the party calling, a geographic location of the party being called, as well as other possible information such as identifying information about the device of the caller/callee devices. As described in further detail below, the log information collected for calls may be processed to identify and block phone numbers associated with undesirable behaviour.

The processing of the data collected from the various network elements 104 may be performed by one or more servers 110. The server(s) 110 comprises one or more processing units 112 for executing instructions and memory units 114 for storing instructions which when executed by the processing units 112 configure the server(s) 110 to provide functionality for identifying and blocking phone numbers associated with undesirable behaviour. The server (s) 110 may also include non-volatile (NV) storage 116 as well as one or more input/output (I/O) interfaces 118 for connecting internal and/or external components, devices and/or peripherals to the server(s) 110.

The functionality 120, which is provided by executing the instructions stored in the memory, includes data collection functionality 122 for processing the data collected by the network elements 104, detection functionality 124 for detecting, or rather identifying, phone numbers associated with undesirable behaviour, action functionality 126 for blocking and unblocking phone numbers, investigative interface functionality 128 for providing an interface to investigators of the telephone network operator, as well as additionally investigative processing functionality 130.

Broadly, the data collected by the network elements 104 is pre-processed by the data collection functionality 122 and the pre-processed data is used by the detection functionality 124 to identify phone numbers associated with undesirable call behaviour. The identified phone numbers associated with undesirable call behaviour can be blocked/unblocked or other actions may be taken by the action functionality 126. The actions may be taken automatically, or may be taken based on additional user (e.g. network operator level) input. In a non-limiting example, the additional user input may be provided by an investigator using an interface provided by the investigative interface functionality 128. The investigative interface functionality 128 may also use or solicit additional information that may be useful to the investigator and provided by the investigative processing functionality 130.

As described above, the data collection functionality 122 pre-processes data collected by the network elements 104. The raw call log data may be stored or accessed in numerous different ways, which are depicted schematically as a database 132 in FIG. 1. The raw call data log records from the network elements 104 are processed by log pre-processing functionality 134 to generate processed call records 136. The pre-processing may include minor processing such as cleaning and standardization of records for ensuring dates and times of records provided from different network elements, and thus possibly in different formats, are in the same format, as well as more major processing. For example, the processing may include identifying and aggregating raw call records, and/or possibly previously processed call records, that are associated with the same call. Aggregating call records associated with the same call can be achieved in various ways. For example, the records may be aggregated together into a single aggregate call record. Additionally or alternatively, the call records associated with the same call may be labeled with a unique call identifier to allow aggregated records to be quickly identified. Additionally or alternatively, a record or other indicator can be provided that identifies all of the related call records that are associated with the same call. In addition to the unique call identification, the processing may further include computing or determining any metrics or features used in the anomaly and/or scam detection.

The raw call data logs may be periodically processed in relatively short periods. For example, the raw call data logs may be processed every 5 minutes. Alternatively, this processing may be done in longer or shorter intervals, or possibly in real time. Regardless of the time intervals of processing the raw call data logs, once the records are processed by the log pre-processing functionality 134 the resulting call records 136 can be stored for subsequent processing by the detection functionality 124.

The detection functionality 124 may comprise various different functionality for processing the call records 136 to identify phone numbers associated with undesirable behaviour. As depicted in FIG. 1 the detection functionality may include general anomaly detection functionality 138 that detects anomalous behaviour in call patterns. The phone numbers that are identified by the general anomaly detection functionality 138 may be associated with behaviours that are out of the normal, although may not require being blocked. In a non-limiting example, the anomalous phone numbers identified by the general anomaly detection functionality 138 may be presented to investigators which may help speed the identification of additional scams or undesirable call behaviour. The general anomaly detection may be done in various ways using algorithms or techniques for identifying anomalies. In addition to the general anomaly detection functionality 138, the detection functionality 124 may further include specialized detection models 140 that detect specific undesirable call behaviour. For example, the specific detection models 140 may include a Wangiri fraud detection model 142 that detects phone numbers, and in particular caller phone numbers, associated with Wangiri fraud calls. Additional detection models 144 may include models trained to detect other specific types of possibly undesirable call behaviour, such as revenue service call fraud, Microsoft™ support scam, etc.

Each of the detection functionalities 138, 142, 144 may label or otherwise provide some other indication of the phone numbers that were detected by the various functionalities as possibly being associated with undesirable call behaviour. That is, for example, the general anomaly detection functionality 138 may provide an indication of one or more phone numbers that were determined to be anomalous, the Wangiri detection functionality 142 may provide an indication of one or more phone numbers that were determined to be associated with Wangiri fraud calls, etc. Details of illustrative implementation of both the general anomaly detection functionality 138 and the Wangiri detection functionality 142 are described in further detail below.

Once one or more phone numbers have been identified by the detection functionality 124, one or more actions may be taken on the phone numbers by action functionality 126. The actions may be taken automatically, or may be taken after some form of user interaction, for example by an investigator of the network operator. For example, an anomalous phone number may not be blocked automatically, but may be marked for blocking after an investigation or further review by an investigator. As depicted, the action functionality 126 may include phone number blocking functionality 146 and phone number unblocking functionality 148.

Depending upon how phone numbers are marked for blocking as well as the level of acceptability of potentially blocking a valid phone number, the blocking functionality 146 may, in a non-limiting example, simply automatically block all provided or marked phone numbers. Alternatively, the blocking functionality may include one or more checks or business rules that are applied to the phone numbers marked for blocking and only those phone numbers passing all of the checks may be blocked.

The phone numbers identified by the detection functionality 124 may be automatically passed to the phone number blocking functionality 146, or they may first be passed to investigative interface functionality 128 for generating an interface for use by an investigator. The investigative interface functionality 128 may include a graphical user interface (GUI) generation functionality 150 that generates an investigative interface that may present the identified telephone numbers to an investigator, which may allow the investigator to determine whether or not the phone number(s) should be blocked or not. The GUI that is generated may include an indication, such as a button or other GUI element, that allows the investigator to select a phone number for subsequent blocking by the phone number blocking functionality 146. In addition to providing an indication of one or more of the phone numbers identified by the detection functionality 124, the GUI may further include additional information that may be helpful to an investigator in determining whether to block a phone number or not.

In order to provide the additional information, the investigative interface functionality 128 may include data collection functionality 152 for retrieving or accessing the additional information presented in the generated GUI. The data collection functionality 152 may retrieve information from various sources. For example, the data collection functionality may retrieve information from one or more subscriber data sources of the telephone network operator to retrieve information associated with phone numbers that are provided by the telephone network operator. Additionally, the data collection functionality 152 may retrieve information from other sources such as provided by the investigative processing functionality 130.

The investigative processing functionality 130 may include one or more different functionalities or elements for providing additional relevant information. For example, the investigative processing functionality may include honey pot number functionality 154 that provides a honey pot phone number that is not used for other purposes and as such any numbers calling the honey pot phone number may be considered anomalous or presenting undesirable behaviour. Additionally, the investigative processing functionality 130 may include automated call-back functionality that can call back identified phone numbers, including for example suspicious numbers or those potentially associated with undesirable behaviours, and record the phone call. The automated call back functionality 156 may simulate a call. Additionally, the investigative processing functionality 130 may include $3^{rd}$ party data collection functionality 158 that can retrieve or access information from $3^{rd}$ party sources such as yellow-page information or $3^{rd}$ party sources collecting information about robocalls or possible fraudulent calls.

FIG. 2 depicts a portion of an illustrative user interface. The GUI 200 may include, for example an area 202 indicating the phone numbers 202 as well as an area with the predictions 204 for each of the numbers, such as either being a relatively certain Wangiri, or a Wangiri that requires manual review. The GUI may also include an area 206 that enables a user to provide their own categorization of the call, as well as another area showing other information such as a recording of the call 208. It will be appreciated that other GUIs and/or layouts are possible.

Returning to the general anomaly detection functionality 138 depicted in FIG. 1, the functionality 138 may use an Isolation Forest approach for detecting anomalies. The anomalies may be detected over various time periods such as hours, days, weeks, etc. As will be appreciated by those skilled in the art, the Isolation Forest algorithm is an unsupervised variant of the Random Forest algorithm, which ensembles multiple weak predictors, aka trees. In a non-limiting example, the features used by the Isolation Forest model may include. among others, for example:
  num_incoming_calls which is the number of unique incoming calls;
  num_outgoing_calls which is the number of unique outgoing calls;
  incoming_call_rate which is num_incoming_calls/num_outgoing_calls;
  call_duration which is how long a conversation lasts for a given call record;
  num_callees which is the number of unique callees; and
  inter_start_time which is the start time of a call.

The Isolation Forest model, tuned using features including those mentioned above, may assign an anomaly score to each number, or originating phone number, which may also be known as calling party or caller. Experiments have shown that the more anomalous the behavior of a particular anumber is, as defined by the features including those mentioned above, the more likely it is to be assigned a higher anomaly score by the Isolation Forest algorithm, as compared to anumbers that demonstrate "normal" behavior. It will be appreciated that in order to evaluate the detection performance of the Isolation Forest model, one or more sources of verified anomalous phone numbers may be used. For example, the sources used may, for example, be Yellow Pages and/or Nomorobo or similar other sources, which are relatively less biased sources of information due to their crowd-sourced nature.

During performance tuning using Yellow Pages sourced data, it was found that the naïve Isolation Forest model did not result in acceptable accuracy when evaluated by the Yellow Pages reported rate (as defined below). By performing experiments, however, it was found that the addition of a filtering step that eliminated all anumbers with outgoing calls less than a threshold improved the accuracy by approximately 30% when compared to the baseline. Note that the filtering step was not used when evaluating the model using Nomorobo data but still achieved acceptable accuracy.

As a result of the performance tuning experiments, it will be appreciated that the general anomaly detection functionality 138 may, in a non-limiting example, include two Isolation Forest models: (1) the naive Isolation Forest model that detects anomalies that are likely to be also reported by Nomorobo, and (2) the filter controlled Isolation Forest model that detects anomalies that are likely to be also reported by Yellow Pages.

Varied measures may be used to evaluate the performance of the two Isolation Forest models. To evaluate the filter controlled model using Yellow Pages sourced data, one measure that may be used is the Yellow Pages reported rate $\gamma$ which, for an anumber a that is flagged by the model and is also reported on Yellow Pages, is given by:

$$Y = \left[\sum YP_{reported}\right] / N$$

Where $$YP_{reported}(a) =$$

1 if $\left(\frac{YP_{scammer}(a) + YP_{debt}(a)}{YP_{total}(a)}\right) > 0.5;$ 0 otherwise.

And N is the total number of anomalies detected by the model.

To evaluate the naïve model using Nomorobo sourced data, one measure that may be used for example is the Nomorobo reported rate $\phi$, which, for an anumber a that is flagged by the model, is given by:

$$\Phi = [\Sigma Nomorobo_{reported}(a)]/N$$

Where Nomorobo$_{reported}(a)$=

1 if the number is found reported as a robocaller in Nomorobo;

0 otherwise.

And N is the total number of anomalies detected by the model.

The Yellow Pages reported rate indicates how many anumbers out of the detected anomalies are reported as scammers or debt collectors on Yellow Pages, while the Nomorobo reported rate indicates how many anumbers out of the detected anomalies are reported as robocallers in Nomorobo.

The execution time for performing a grid search in order to tune the parameters of the Isolation Forest models was found to be prohibitive. Therefore, random search was performed instead, using the popular Python library scikit-learn. For the model tuned using Nomorobo sourced data, with 3 fold cross-validation, the resulting accuracy in terms of Nomorobo reported rate was 48.4%.

For the filter controlled Isolation Forest model, an iterative grid search was performed. With 3 fold cross-validation, the resulting accuracy in terms of Yellow Pages reported rate was 60%.

The Precision score was evaluated in a real run, and was calculated by dividing the total number of distinct anumbers that were reported in either Nomorobo or in Yellow Pages by the total number of all anumbers detected as anomalies. The best Precision score observed was 73.87%, on Jan. 3, 2019. During business days, the Precision score is usually observed to be around 60%, while on Sundays, it is usually observed to be less than 40%.

The above has described the anomaly detection as attempting to detect robocalls and/or debt collector/telemarketer calls. It will be appreciated that other anomalous behaviours may also be detected. For example, profile based, or caller behavior based, anomaly detection is possible. In profile based anomaly detection, for example, one might first establish a profile for each caller in the data. The profile may be established by looking at all available call history for each caller, or a subset of it. By analyzing these profiles, it is possible to find unusually deviant behavior, such as sudden spikes/drops in number of calls, sudden increase in calls to a specific destination number, etc. This may help, for example, in detecting spoofed numbers. To build up each caller's profile, time series analysis can be used, more specifically, moving average of each attribute, matrix profiling to discover motif pattern of spammers and hence the abnormality detection.

Returning to the Wangiri detection functionality 142 depicted in FIG. 1, the detection may be provided in various ways. For example, a simple approach may involve using handcrafted rules/heuristics, using knowledge of the scam characteristics. This may not, however, be the best approach because it typically leads to a proliferation of rules over time, exceptions to the rules and so on. Additionally, any rules may have to be frequently tuned manually to account for changes in scammer behaviour. Further still, the developed approach may not be easily applicable to other kinds of scams, potentially necessitating the development of a highly tailored solution for each type of scam.

A machine learning approach may be used to automatically "learn" the characteristics of a particular scam by using labelled examples of the scam. Such an approach can semi-automatically tune itself over time to account for changes in input data, representing, in this case, scammer behavior.

In a non-limiting example, in order to mathematically model the behaviour of Wangiri scammers, the following features may be used, which can be prepared or derived from the call logs.

1. dt_from: The lower bound of the time interval within which the Wangiri detection was performed
2. dt_to: The upper bound of the time interval within which the Wangiri detection was performed 3. anumber: The calling party's number, for which call records are summarized and all the metrics below are computed
4. num_outgoing_calls: The number of outgoing calls from the anumber
5. num_incoming_calls: The number of incoming calls to the anumber
6. incoming_call_rate: The proportion of incoming calls, relative to outgoing calls. This is computed as num_incoming_calls/num_outgoing_calls
7. num_callees: The number of unique destination numbers called by this anumber
8. callee_rate: The proportion of unique callees, relative to outgoing calls. This is computed as num_callees/num_outgoing_calls
9. inter_arrival_time_mean: The average of the inter-arrival time between calls. The inter-arrival time is the interval of time between two successive calls. Note: This is measured in minutes.
10. inter_arrival_time_stddev: The standard deviation of the inter-arrival time between calls, measured in minutes
11. call_duration_mean: The average of the call duration of all outgoing calls made by this anumber. Note: This is measured in milliseconds. This may be replaced by incoming_call_duration and outgoing_call_duration
12. call_duration_stddev: The standard deviation of the call duration of all outgoing calls made by this anumber, measured in milliseconds Metrics #4 to #12 above are the predictors (aka features) in the Wangiri model, while the response is a class label that can take on one of two values—"Wangiri" or "Not Wangiri". It will be appreciated that this is an example of a binary classification problem.

The approach used to solve this problem is to estimate one or more mathematical functions that describe the relationship(s) between the predictors and the response. The function(s) may be typically estimated from a set of manually labelled data that provides examples of each class. These functions, which constitute a model, may then be used to predict the class label ("Wangiri" or "Not Wangiri") of future data. Labelled training data for the Wangiri class may be obtained using the investigator interface which may initially present investigators with anomalous phone numbers to be investigated. The calls that the investigator consider to be Wangiri can be labelled and used for the training data. The non-Wangiri class training data may be obtained from random sampling of the call data since the vast majority of call data passing over a telephone network will not be Wangiri calls.

The Wangiri detection model may use a Random Forest classifier. This particular classifier was determined to be preferable after comparing the performance of several different classifiers on the labelled data. Model hyperparameters (number of estimators and maximum number of features) were chosen using a Grid Search using 10 fold cross-validation, with the objective of choosing the parameter combination that maximized the F1-Score. The rationale for choosing to optimize the F1-Score, rather than the Precision or Recall, is to provide a balance between false positives and false negatives for the initial model. Originally, the selection criteria solely consisted of maximizing the Precision, but a quick ad-hoc analysis showed that some models with slightly lower precisions (−2%) had significantly higher recalls (+20%). The slightly lower precision, which can result in legitimate numbers being incorrectly identified as Wangiri numbers can be addressed by developing additional rules or filters to filter out the legitimate numbers from the Wangiri numbers. Using a business logic layer to protect legitimate customers from accidentally being blocked, optimizing on the F1-Score, provides significant recall, while mitigating any consequence of a slightly lower precision.

The best estimator chosen from the Grid Search has the following scores (over 10 folds):
Mean F1-Score=0.94; std=0.03
Mean Precision=0.96; std=0.04
Mean Recall=0.93; std=0.04

Figure 6:
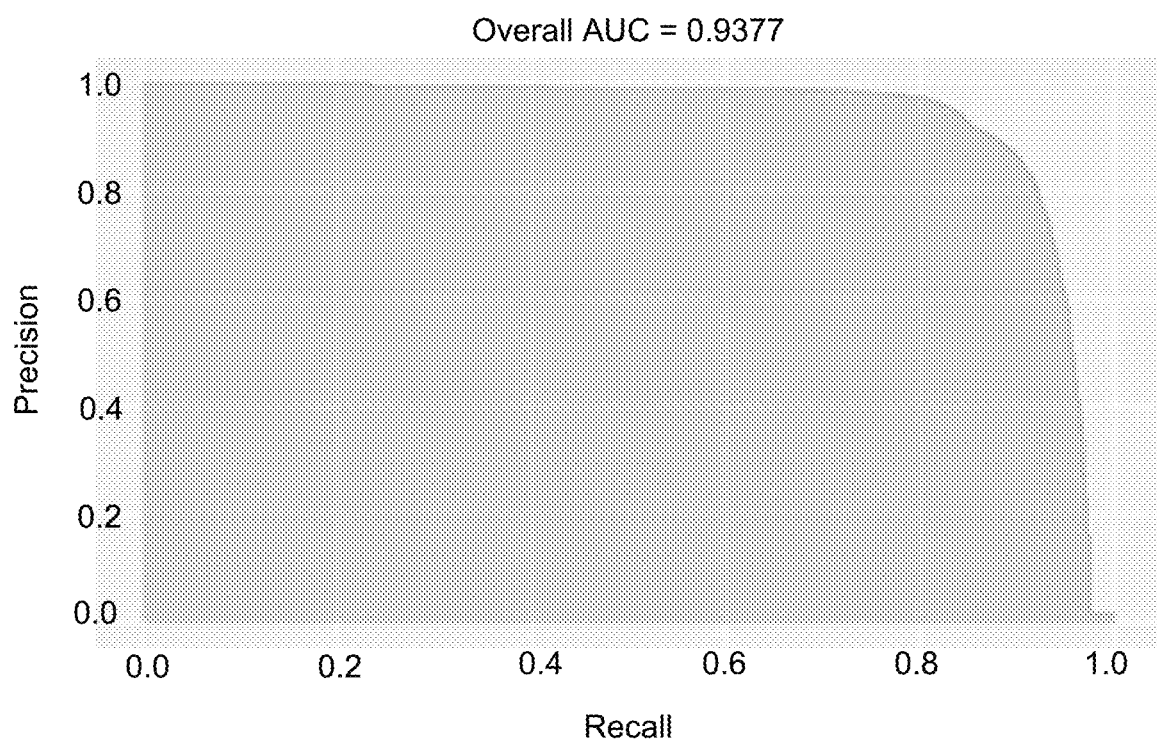
FIG. 6 depicts a Precision-Recall curve.

The Precision-Recall curve is shown in FIG. 6. The curve indicates that the chosen estimator has good classification performance on the test set.

The labelled dataset used in this modelling process is fairly large and imbalanced (232,477 examples in total; the positive class makes up 1.73% of total). Due to this, training certain ML algorithms turned out to be infeasible due to very large runtimes. In particular, finding the best estimator using a grid search (or even a random search) for the Support Vector Machine (SVM) with a non-linear kernel and >5 fold cross-validation took unreasonably long. The Random Forest (RF) classifier was chosen mainly for its computational advantages (as well as good classification performance in general), such as the fact that it is inherently parallelizable. Further, RF is relatively less sensitive to the choice of initial values of hyperparameters.

Those skilled in the art will appreciate that it is particularly desirable to have an end-to-end automated system in place that detects and blocks Wangiri scammers, as well as other scams, with minimal human intervention. This blocking may be done automatically; however depending on the level of false positives that are acceptable to be blocked in error, additional logic may be used to further filter out possible legitimate phone numbers that were incorrectly identified as Wangiri numbers. As an example, this logic may, for each suspected Wangiri number, verify that:

The number has not been detected as a Wangiri number above some threshold number of times, since typically a Wangiri scammer will not re-use phone numbers;

The phone number has some threshold number of international calls since Wangiri calls typically originate from overseas numbers;

The phone number is similar to other phone numbers recently detected as Wangiri calls, since typically Wangiri scammers will often use blocks of sequential numbers.

It will be appreciated that the above logic may be weighted so that the importance of one test compared to another may be varied as desired. Further, additional or alternative logic may be used to ensure any incorrectly identified Wangiri numbers are not blocked.

A semi-automated approach may be used to block Wangiri phone numbers, or other scam numbers. In a non-limiting example, the semi-automated approach may automatically block verified Wangiri numbers; however use of a human investigator may be used to verify that Wangiri numbers predicted by the detection model are in fact Wangiri numbers. For example, the predicted Wangiri numbers may be presented to an investigator, possibly along with additional useful information for verifying that the call is a Wangiri call, and the investigator may then either verify or refute the prediction. In addition, the verified/refuted predictions may also be used as training data to further train the prediction models.

The Wangiri detection model may divide model predictions for predicted Wangiri calls into two buckets—"Wangiri" and "Manual Review"—for display to human analysts. This division is based on a general rule that applies to most Wangiri scam calls, namely that the originating number typically originates from overseas. To quantify this, it is possible to compute:

I=the ratio of international call records to all call records

The division into the two buckets is then performed by applying thresholds on the value of I. The "Wangiri" bucket includes numbers that are with high confidence Wangiri scammers. The "Manual Review" bucket includes numbers that, although identified by the ML model as Wangiri, are less certain, taking into account the value of I.

The items tagged for manual review are intended to be manually investigated and labelled by human analysts. With this process in place, it is possible to create an automatic feedback loop where:

The thresholds used for computing I are re-discovered from these newly labelled data The model occasionally retrains by including these newly labelled data Alternatively, it is possible to make I a feature for the model itself, rather than post-processing and using thresholds on it.

To avoid over fitting during the automatic training, it is possible to use normal business users' numbers and common users' numbers that have never been flagged (or numbers that are known to be good).

Figure 3:
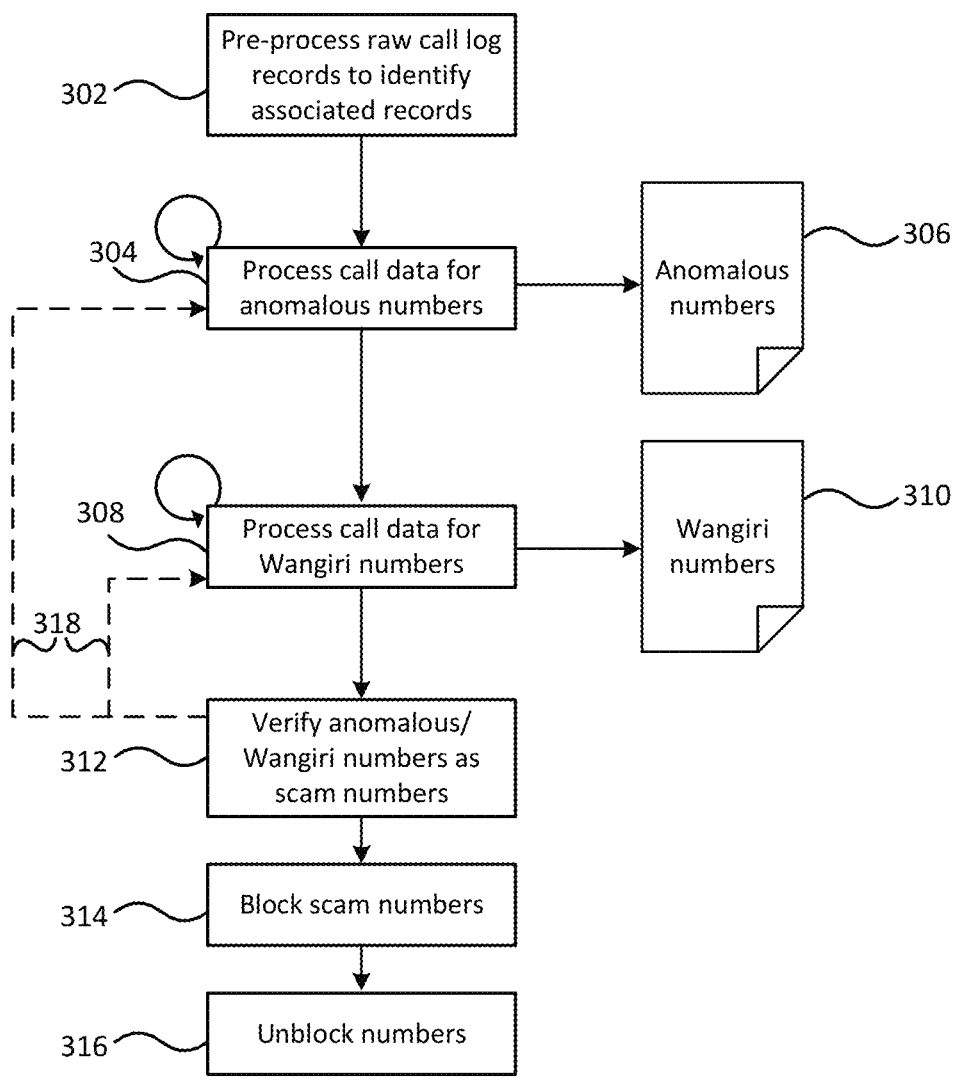
FIG. 3 depicts a method for identifying and blocking phone numbers associated with robocalls and/or scam calls.

FIG. 3 is a flowchart depicting a method for identifying and blocking phone numbers associated with robocalls and/or scam calls. The method 300 begins with pre-processing raw call log records to identify different records that are associated with the same call (302). Depending upon how often the raw call log data is processed, there may be associated call records that are not in the batch of raw call logs currently being processed and as such the associated call records may have already been pre-processed. The pre-processing may also include determining the features used by the different detection models, or the feature calculation or extraction may be performed after the pre-processing of the raw call log data. Once the raw call log data has been processed, the processed call records may be processed using an anomaly detection model (304) to identify phone numbers exhibiting anomalous behaviour. Phone numbers that are identified as being anomalous may be stored or otherwise identified for example in an anomalous numbers list 306. The call records may also be processed by one or more models for detecting specific behaviours, such as a Wangiri detection model to identify numbers associated with Wangiri behaviours (308). The phone numbers identified by the model as being Wangiri numbers may be stored or identified, for example in a Wangiri numbers list 310. It is possible to process the anomalous detection model and the Wangiri detection model, and any other detection models either sequentially or concurrently. The anomalous numbers and Wangiri numbers may be verified as scam or undesirable numbers (312). The verification may be done using additional rules or logic or may be done by an investigator or analyst. After numbers have been verified as scam or associated with undesirable behaviour, they may be blocked (314). It will be appreciated that after blocking the numbers, they may be unblocked (316). For example, it may be desirable to unblock numbers, either in the case of incorrectly blocking a legitimate number or if the scammers have stopped using the number.

Figure 4:
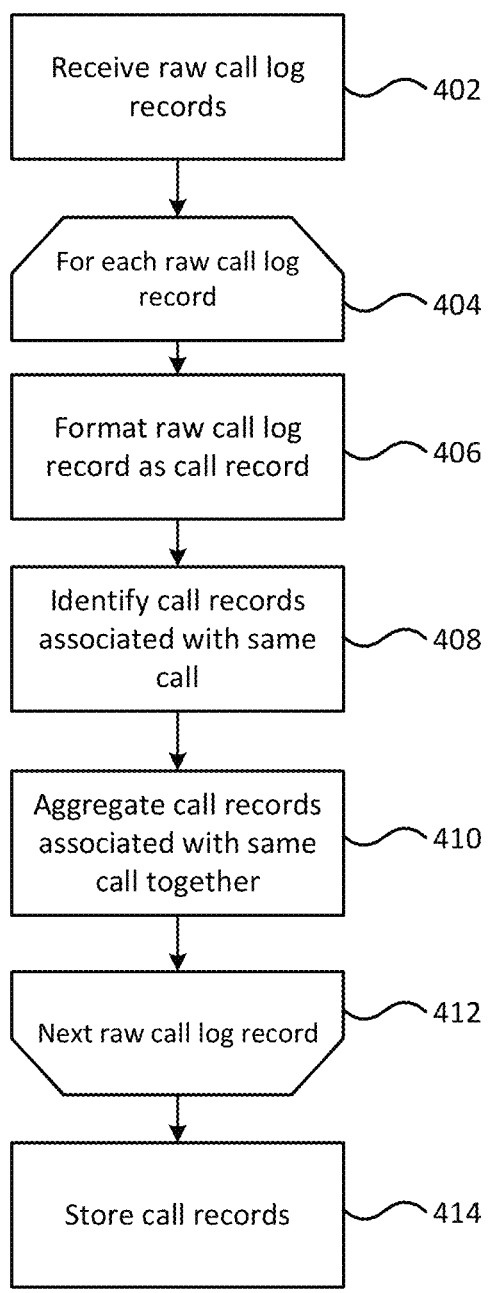
FIG. 4 depicts a method of pre-processing raw call log records.

FIG. 4 depicts a method of pre-processing raw call log records according to a non-limiting aspect of the invention. The method 400 begins with receiving raw call log records (402). The raw call log records may be received and processed in real-time or in batches, for example every 5 minutes. For each raw call log record (404) the raw call log record may be formatted as a call record (406), for example by placing the raw call log record into a standard format. The call records associated with the same call, which may include previously processed call records, are identified (408). The call records identified as being associated with the same call may be aggregated together (410). The call records may be aggregated into a single record, or a label or other indicator may be added to all of the associated call records in order to easily identify which call records are associated with the same call. Once the call records are aggregated, the next call record may be processed (412). After processing the call records, they may be stored and/or passed on to another process (414), such as the prior described detection models.

Figure 5:
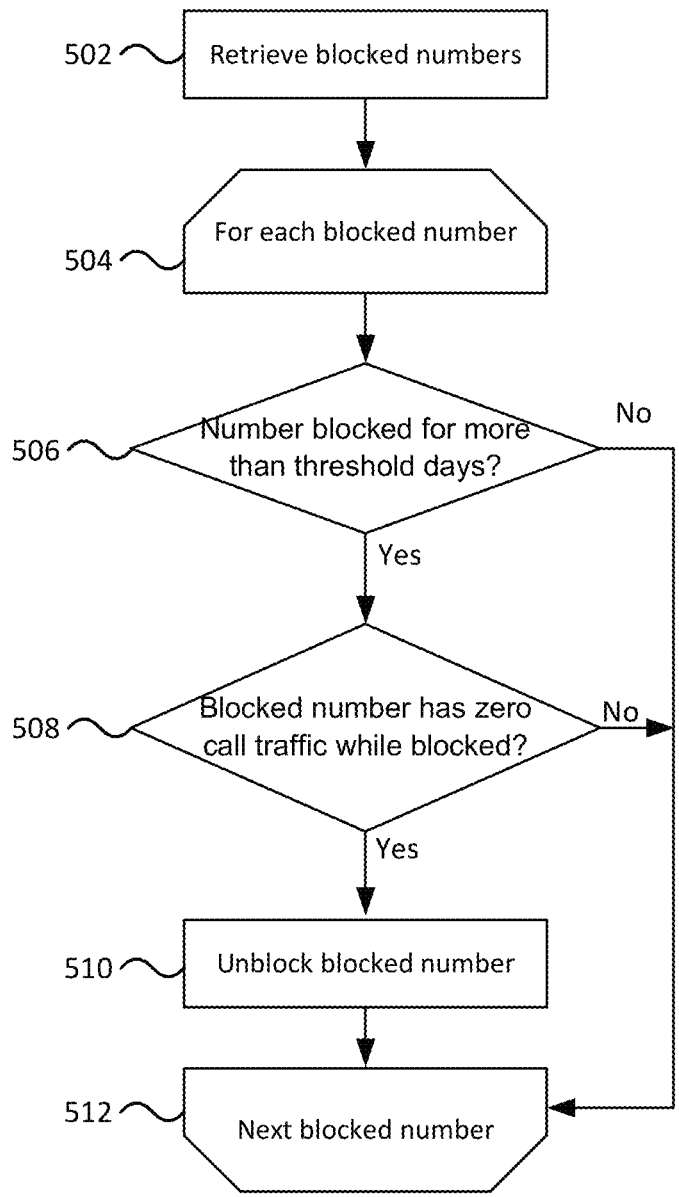
FIG. 5 depicts a method for unblocking blocked phone numbers.

FIG. 5 depicts a method for unblocking blocked phone numbers according to a non-limiting aspect of the invention. The method 500 may be used to unblock numbers that are no longer being used by scammers so that they may be used for legitimate purposes. It is possible to have other processes to unblock numbers, such as through a customer support interface that allows incorrectly blocked numbers to be easily unblocked. The method 500 may be performed periodically, for example every day, by retrieving a list of blocked numbers (502). For each blocked number (504), it is determined if the number has been blocked for a threshold number of days (506), for example 5 days may be used as the threshold. If it has not yet been blocked long enough (i.e. No at 506), the number remains blocked and the next number is processed (512). If the blocked number has been blocked for a threshold number of days (i.e. Yes at 506), it is determined if the blocked number has had no or zero call traffic for the past threshold number of days (508). If there has been call traffic in the past threshold number of days (i.e. No at 508), the number remains blocked and the next number is processed (512). If however there has been no call traffic for the past threshold number of days (i.e. Yes at 508), the number may be unblocked.

Although certain components and steps have been described above, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope.

What is claimed is:

1. A system for use in blocking phone numbers in a telephone network comprising:
   one or more processors for executing instructions; and
   at least one memory for storing instructions, which when executed by at least one of the one or more processors configure the system to perform a method comprising:
      receiving from a plurality of telephone network elements a plurality of raw call log records;
      generating processed call records by periodically processing the received plurality of raw call log records, comprising:
         formatting each of the raw call log records into a corresponding call record having a common format; and
         identifying raw call log records or call records associated with a same call; and
         aggregating raw call log records or call records associated with the same call together;
      periodically processing the processed call records, comprising:
         processing the processed call records using a first trained model to identify phone numbers associated with anomalous call behaviour as anomalous phone numbers; and
         processing the processed call records using a second trained model to identify phone numbers associated with a first undesirable type of call behaviour as first undesirable call type phone numbers; and
      blocking at least one phone number of the anomalous phone numbers and the first undesirable call type phone numbers from making calls over the telephone network.

2. The system of claim 1, wherein the first undesirable call type is a Wangiri type scam call.

3. The system of claim 1, wherein the at least one phone number that is blocked is further processed to ensure the number should be blocked prior to being blocked.

4. The system of claim 1, wherein the method provided by executing the instructions further comprises:
   automatically calling at least one of the phone numbers of the anomalous phone numbers and the first undesirable call type phone numbers; and
   recording a portion of the calls made automatically.

5. The system of claim 4, wherein the method provided by executing the instructions further comprises:
   generating a user interface including an indication of one or more of the anomalous phone numbers and the first undesirable call type phone numbers;
   providing the generated user interface to an investigator of the telephone network operator; and
   receiving from the user interface a selection including the at least one phone number for blocking.

6. The system of claim 5, wherein the generated user interface further includes an indication of the recorded portion of the calls.

7. The system of claim 6, wherein the method provided by executing the instructions further comprises:
   retrieving additional information from one or more sources on the anomalous phone numbers and the first undesirable call type phone numbers; and
   including the additional information in the generated user interface.

8. The system of claim 1, wherein the method provided by executing the instructions further comprises:
   unblocking blocked phone numbers.

9. The system of claim 8, wherein unblocking blocked phone numbers comprises:
   identifying blocked phone numbers; and
   for each blocked phone number, determining if there has been no call activity over the telephone network associated with the blocked phone number for a threshold period of days, and unblocking the blocked phone number when it is determined that the has been no call activity for the threshold period of days.

10. A method for use in detecting fraudulent phone numbers associated with undesirable behavior in a telephone network, comprising:
    receiving from a plurality of telephone network elements a plurality of raw call log records;
    generating processed call records by periodically processing the received plurality of raw call log records, comprising:
       formatting each of the raw call log records into a corresponding call record having a common format;
       identifying raw call log records or call records associated with a same call; and
       aggregating raw call log records or call records associated with the same call together;
    periodically processing the processed call records to detect fraudulent phone numbers by:
       processing the processed call records using a first trained model to identify phone numbers associated with anomalous call behaviour as anomalous phone numbers; and
       processing the processed call records using a second trained model to identify phone numbers associated with a first undesirable type of call behaviour as first undesirable call type phone numbers.

11. The method of claim 10, wherein the first undesirable call type is a Wangiri type scam call.

12. The method of claim 10, wherein the method further comprises:

automatically calling at least one of the phone numbers of the anomalous phone numbers and the first undesirable call type phone numbers; and recording a portion of the calls made automatically.

13. A system for detecting fraudulent phone numbers associated with undesirable behavior in a telephone network, comprising:

one or more processors for executing instructions; and at least one memory for storing instructions, which when executed by at least one of the one or more processors configure the system to perform a method comprising:

receiving from a plurality of telephone network elements a plurality of raw call log records;

generating processed call records by periodically processing the received plurality of raw call log records, comprising:

formatting each of the raw call log records into a corresponding call record having a common format; and identifying raw call log records or call records associated with a same call; and aggregating raw call log records or call records associated with the same call together;

periodically processing the processed call records to detect fraudulent phone numbers by:

processing the processed call records using a first trained model to identify phone numbers associated with anomalous call behaviour as anomalous phone numbers; and processing the processed call records using a second trained model to identify phone numbers associated with a first undesirable type of call behaviour as first undesirable call type phone numbers.

14. The system of claim 13, wherein the first undesirable call type is a Wangiri type scam call.

15. The system of claim 13, wherein the method provided by executing the instructions further comprises:

automatically calling at least one of the phone numbers of the anomalous phone numbers and the first undesirable call type phone numbers; and recording a portion of the calls made automatically.

* * * * *